(No Model.)
W. H. DENNEY.
CLAMP OR VISE.
No. 357,524. Patented Feb. 8, 1887.
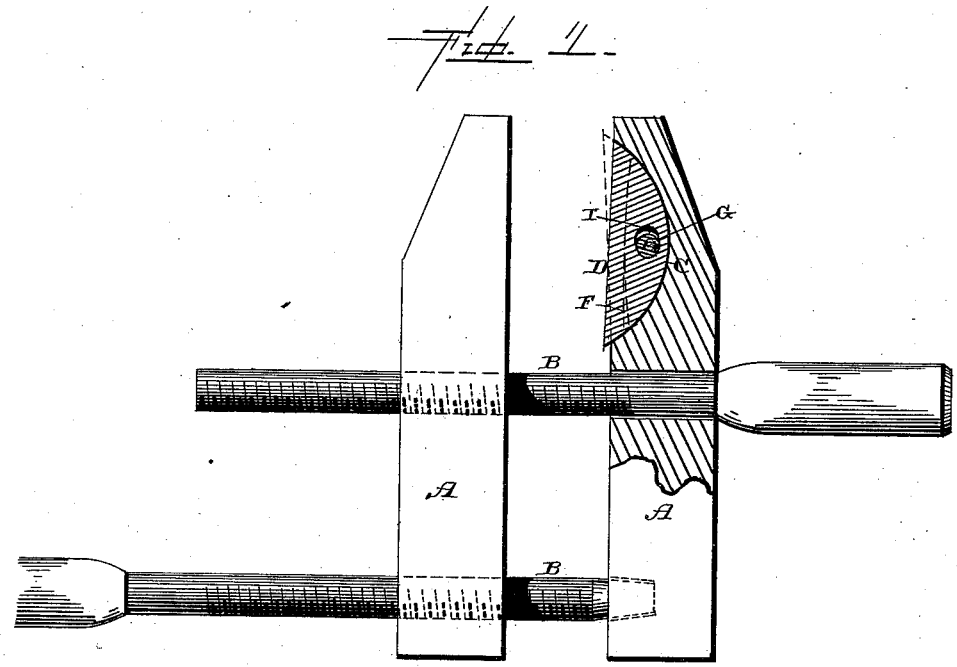
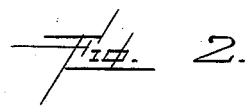
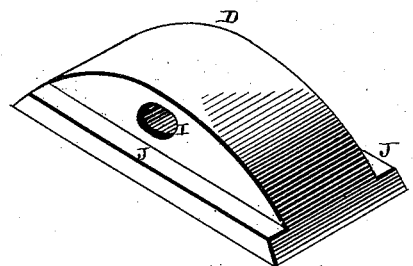
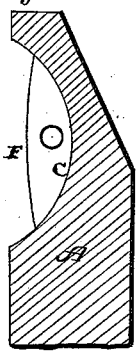
Witnesses.
R. L. Gardner
A. W. Brecht
Inventor:
Wm. H. Denney,
per J. A. Lehmann, atty

UNITED STATES PATENT OFFICE.

WILLIAM H. DENNEY, OF LANCASTER, PENNSYLVANIA.

CLAMP OR VISE.

SPECIFICATION forming part of Letters Patent No. 357,524, dated February 8, 1887.

Application filed October 4, 1886. Serial No. 215,286. (No model.)

*To all whom it may concern:*

Be it known that I, WILLIAM H. DENNEY, of Lancaster, in the county of Lancaster and State of Pennsylvania, have invented certain new and useful Improvements in Clamps or Vises; and I do hereby declare the following to be a full, clear, and exact description of the invention, such as will enable others skilled in the art to which it pertains to make and use it, reference being had to the accompanying drawings, which form part of this specification.

My invention relates to an improvement in clamps or vises; and it consists in the combination of one of the jaws, which has a concave recess formed in the inner side of its upper end, with an adjustable slotted bearing-piece, which is convex on its rear side, provided with bearing-flanges on its opposite sides and placed in the recess in the jaw, and a pivotal pin, which is passed through both jaw and bearing-piece, as will be more fully described hereinafter.

The object of my invention is to provide an adjustable bearing-piece for one or both jaws of a clamp or vise, and which turns upon a pivot of its own, so that it will automatically adjust itself to a straight or flat object between the jaws in case they do not draw parallel.

Figure 1 is a side elevation of a clamp to which my invention is applied, one of the jaws being shown partly in section. Fig. 2 is a perspective of the bearing-piece alone. Fig. 3 is a vertical section of the upper end of the recessed jaw.

A represents the two jaws of a clamp or vise, of any suitable construction, and B the operating-screws. In the inner side of the upper end of one or both of the jaws is made a recess, C, of suitable length and depth, and which is made concave upon its bottom, so that the bearing-piece D, which is placed therein, can freely rock or tilt endwise. Upon each side of the recess the edge of the jaw is cut away, as shown at F, and these cut-away edges are also formed on a slight curve. Through the jaw, at or near the center of the recess, is transversely passed the pivotal pin G, which holds the bearing-piece in place.

The bearing-piece D is made flat upon its front side, where it is to bear against the object to be clamped, convex upon its rear side, where it fits in the recess C, and is provided with the slot I, for the pin G to pass through, so that it can have a slight endwise movement. The slot I is of sufficient length to allow the bearing-piece to adjust itself endwise sufficiently to prevent any strain, arising from clamping an uneven object, from coming directly on the pivotal pin G, as would otherwise be the case. By having a slight endwise movement this bearing-piece more readily adapts itself to inclined objects or to flat straight objects, where the jaws do not move parallel. Upon each side of the bearing-piece is formed a flange, J, which is straight on its inner side, so that the bearing-piece will readily tilt or rock. These flanges serve to broaden the bearing of the piece, to prevent any inclination of the piece to twist or turn sidewise, where an irregular object is being clamped, by bearing upon the cut-away edges F, and to help limit the endwise movement of the piece, so that all of the strain cannot come upon the pivotal pin when the piece is forced endwise by pressure against an object of tapering shape.

Both ends of the bearing-piece are curved, as shown, so as to correspond to the curved ends of the recess C. These curved ends coming together, give the bearing-piece a sliding endwise movement whenever it is caused to turn or rock, in order to accommodate itself to any object that is being clamped.

Having thus described my invention, I claim—

The combination of the jaw A, having the curved recess C and the cut-away edges F on each side of the recess, with the pivotal pin, and the slotted bearing-piece D, provided with the flanges J and the slot I, and which has an endwise adjustment in the recess C, substantially as shown and described.

In testimony whereof I affix my signature in presence of two witnesses.

WILLIAM H. DENNEY.

Witnesses:
GEORGE R. ERISMAN,
CHAS. E. LONG.